United States Patent Office 3,010,958
Patented Nov. 28, 1961

3,010,958
C-16-ALKYLATED 1,4-ANDROSTADIENES
Richard Rausser, Union, and Eugene P. Oliveto, Bloomfield, N.J., assignors to Schering Corporation, Bloomfield, N.J., a corporation of New Jersey
No Drawing. Filed Nov. 26, 1958, Ser. No. 776,446
13 Claims. (Cl. 260—239.55)

This invention relates to a new group of androstadienes which have valuable therapeutic properties and to methods for their manufacture. More particularly, our invention pertains to C-16-alkylated 1,4-androstadienes which produce a beneficial euphoric effect in certain abnormally depressed mental patients. Our invention also pertains to intermediates useful in the synthesis of the therapeutically advantageous substances.

The novel final compounds and intermediates leading thereto may be represented by the following formula:

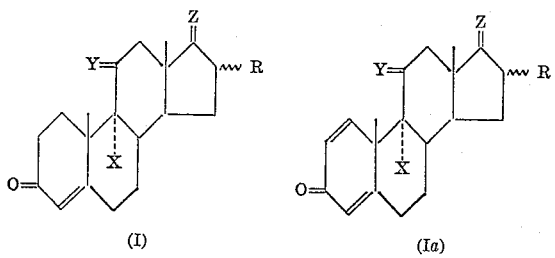

(I)                     (Ia)

wherein R represents a lower alkyl group, Z represents O, (H, βOH), and the lower alkanoyl and phosphate esters of said β-OH, X represents H or halogen having an atomic weight less than 100 and Y represents O or (H, βOH). Also included within our invention are those valuable intermediates of Formulae I and Ia wherein R and Z are as above defined and Y represents (H, αOH) when X is hydrogen, or X and Y together represent a 9β,11β-oxido group or a Δ$^{9(11)}$-double bond.

The therapeutically useful compounds of our invention are valuable in the treatment of neuroses, especially in the treatment of young patients and in the treatment of depressed psychotics. These substances effect a mood elevation or beneficial euphoric effect permitting less rigorous control of mentally disturbed patients.

The preferred compounds are also useful in the treatment of Addisonian patients exhibiting general body weakness and lethargy. Following administration of these substances, there is an increase in activity and in general body tone.

In addition to their primary value in the treatment of mental depression, our new compounds exhibit anti-inflammatory properties and are thus useful in the treatment of diseases such as arthritis. There is a surprising lack of effect of electrolyte balance and no unwanted virilization occurs.

The presence of the 16-alkyl group appears to potentiate or enhance therapeutic properties so that the substance possesses a more favorable therapeutic ratio in comparison with their non-alkylated analogs.

The preferred compounds of our invention which exhibit the foregoing properties are the 9α-fluoro substituted compounds of the general formulae and in particular are 16-methyl (α or β)-9α-fluoro-1,4-androstadiene-11β-ol- 3,17-dione and the corresponding 11-keto analogs. The chloro compounds exhibit similar properties but are not as potent as the fluorine substances. Those compounds, wherein the substituent in the 9α-position is hydrogen or bromine, have their principal utility as being intermediates in the preparation of the preferred species. The 3-keto-1,4-diene system provides for greater potency and thus, although the mono-enes of Formula I do possess the foregoing properties, their principal utility is that of being intermediates in the preparation of the therapeutically active substances. The 11α-hydroxy, 9β,11β-epoxy and Δ$^{9(11)}$-dehydro compounds of Formulae I and Ia are as shown below valuable chemical intermediates. The physiologically active compounds of our invention may be administered orally in the form of tablets, elixirs and the like in admixture with a suitable pharmaceutical carrier. Depending upon the depth of depression being treated or the degree of inflammation requiring reduction, the total daily dose may vary between 10 and 100 mg. In certain instances, such as the treatment of depressed psychotics, parenteral administration is indicated and our substances may be incorporated into parenteral dosage forms such as suspensions, solutions and the like for administration via the intramuscular route. These steroids are quite insoluble in most pharmaceutically acceptable carriers but vehicles such as aqueous dimethylacetamide or aqueous diethylacetamide effect adequate dissolution.

Esterification of the 17β-hydroxyl group provides for a prolongation of action. Esters commonly employed are lower alkanoyl such as acetate, propionate, cyclopentyl propionate and the like. Phosphate esters, such as the dihydrogen phosphate and the hemisuccinate in the form of their sodium salt afford a water soluble preparation. The therapeutic compounds of our invention may be also administered in admixture with one another as to secure the benefit of any advantageous or synergistic effect that is produced.

The new compounds and intermediates thereto may be prepared by a number of alternate processes involving chemical and/or microbiological transformations. The choice of starting material actually determines the procedure and transformations to be employed. On the pages immediately following there are shown three reaction schemes depicting the transformations which can be employed to prepare the compounds of this invention. The basic requirement is that the starting material already contains a lower alkyl group in the 16α or 16β position. In the reaction schemes shown, the 16-alkylated pregnenes (and their further unsaturated analogs) are prepared as described in our co-pending application, Serial No. 733,843, filed May 8, 1958, or the co-pending application of Ilavsky et al., Serial No. 762,926, filed September 24, 1958.

For the sake of clarity, the substituent at C-16 is shown to be methyl as representative of the α- and β-lower alkyl groups such as ethyl, propyl and butyl which may be present. Furthermore, the ultimate products are shown to be 9α-fluoro-11β-hydroxy-17-keto substances. These are representative of all the active products such as the 11-keto, or 17-hydroxy or 9α-chloro analogs. Not shown in the schematic diagrams is the reduction of the 17-keto group to hydroxyl and subsequent optional esterification. The reduction can be effected anywhere along the line of transformations as described below.

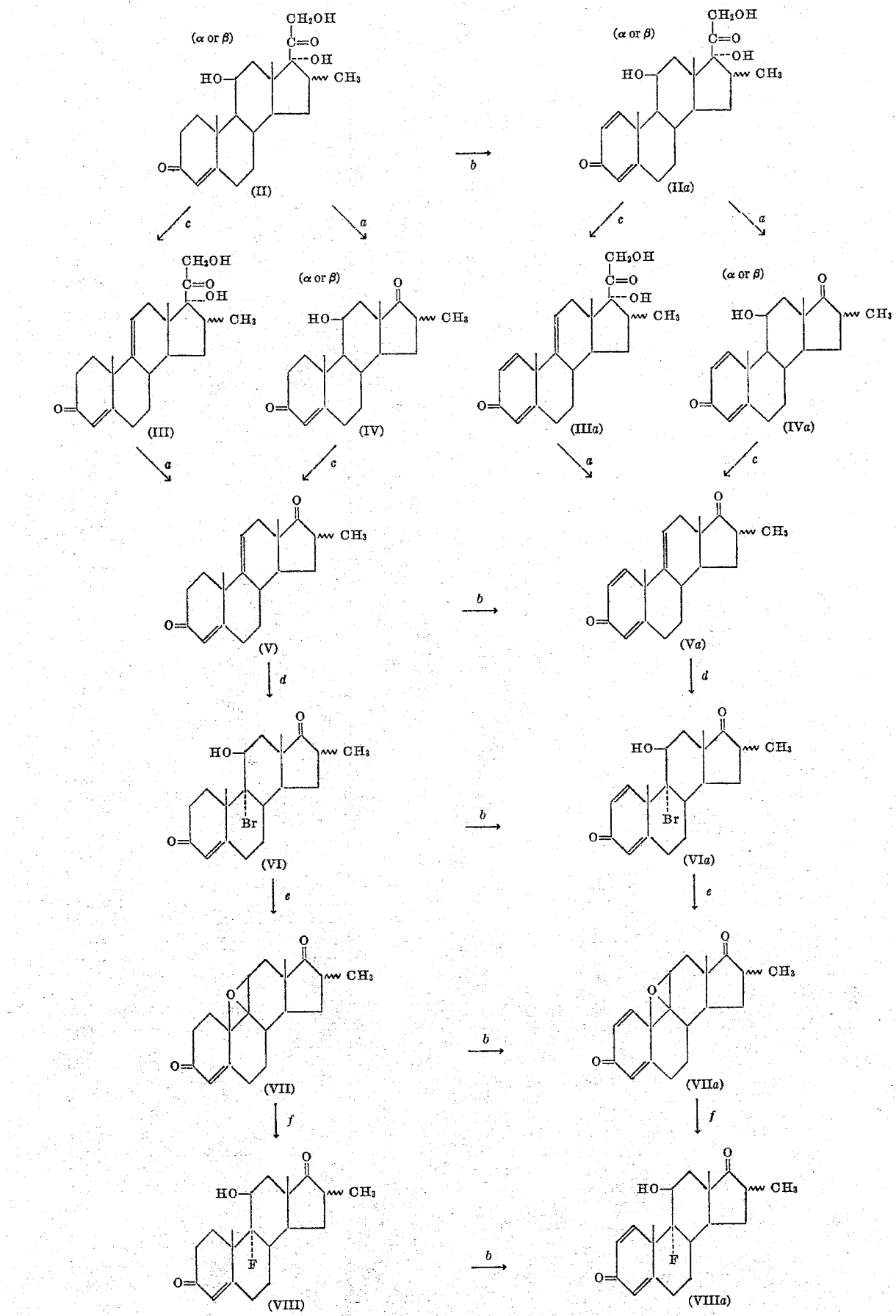
REACTION SCHEME I

SCHEME II

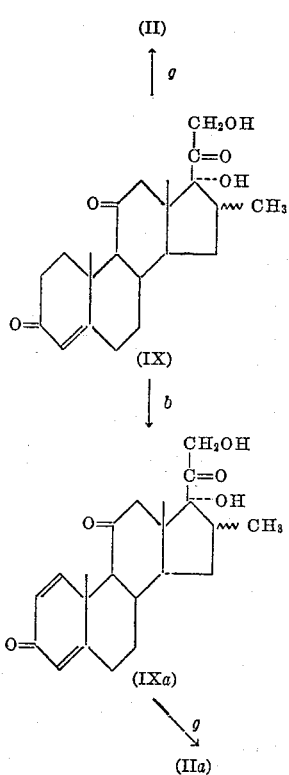

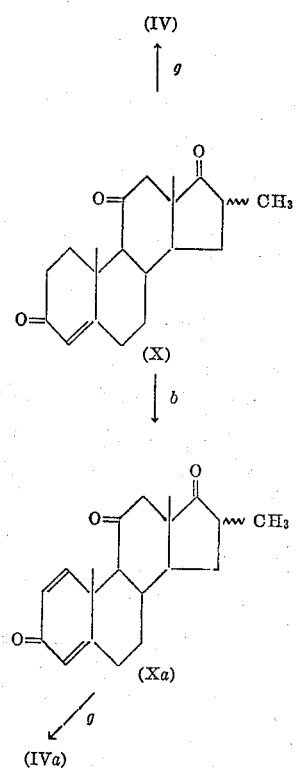

SCHEME III

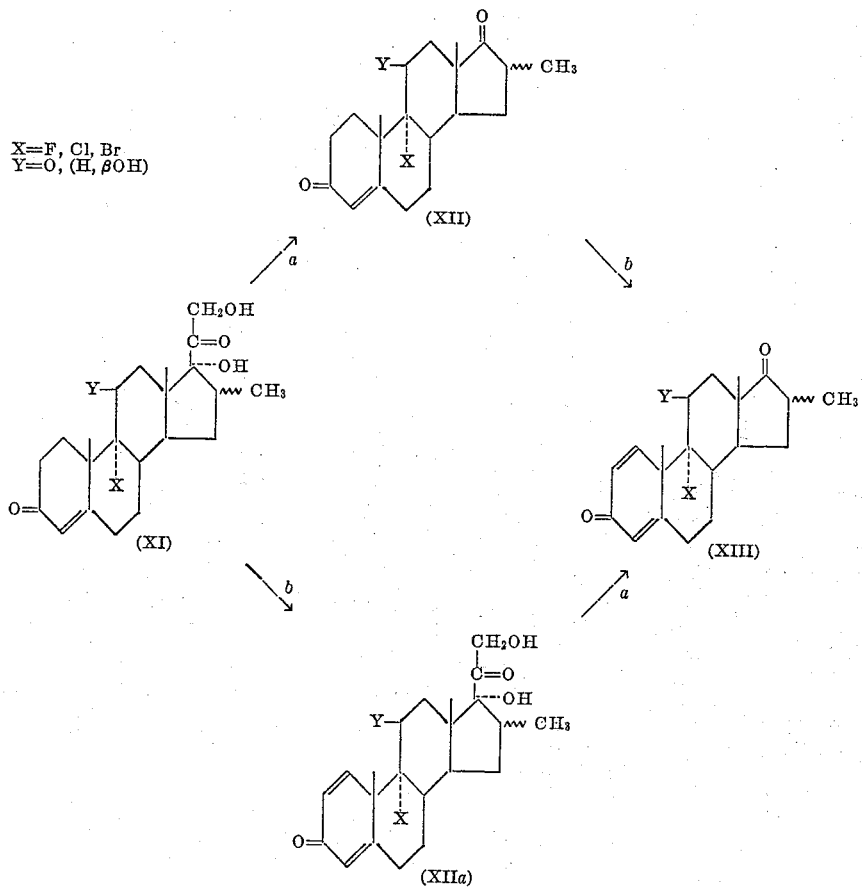

KEY FOR REACTION SCHEMES
(a) Oxidation of pregnane side chain to 17-keto.
(b) Introduction of $\Delta^1$-bond.
(c) Dehydration of 11-hydroxyl to $\Delta^{9(11)}$-ene.
(d) Formation of bromohydrin.
(e) Formation of 9β,11β epoxide.
(f) Opening of epoxide with hydrohalic acid.
(g) Reduction of 11-keto to 11α- or 11β-hydroxy.

We prefer to prepare the 17-keto substances of our invention by an oxidative degradation of the corresponding pregnene compound as shown in Reaction Scheme III. Degradation of the side chain is preferably carried out by means of sodium bismuthate in aqueous acetic acid. In place of sodium bismuthate, other oxidizing agents such as chromic acid may be employed. This reagent, however, is not selective and will also oxidize an 11β-hydroxyl group, if present, to keto. Thus, according to Scheme III, reacting 9α-fluoro-16α-methylprednisolone (Compound XIIa; X=F, Y=OH) with sodium bismuthate, yields without difficulty, the corresponding androstadiene, namely, 9α-fluoro-16α-methyl-1,4-androstadien-11β-ol-3,17-dione (the oxidative degradation step is identified by the symbol "a"). By way of further example, if the starting material is a mono-ene, such as 9α-fluoro-16α-methyl-4-pregnene-11β,17α-21-triol-3,20-dione (XI), the oxidative degradation step may be followed by introduction of a Δ¹-bond, or vice-versa. Introduction of a double bond at C-1, 2 (step b) is effected by microbiological methods such as described in U.S. Patent No. 2,837,464 or chemical methods such as selenium dioxide dehydrogenation, use of bromine with subsequent dehydrobromination, etc.

The oxidative degradation described above inherently gives rise to 17-keto substances. The keto group at C-17 may be reduced selectively in the presence of other keto groups which may be present at C-3 and C-11 by utilizing the microbiological activity of the organism *Saccharomyces cerevisiae*. While it is generally desirable to employ the pure culture of *Saccharomyces cerevisiae*, crude preparations such as Bakers yeast may be used to effect the desired reduction at C-17. This microbiological reduction described in further detail in the examples attached hereto is preferably employed when other keto groups are present. Alternatively, chemical reduction of the 17-keto steroid may be effected with lithium aluminum tri-t-butoxy hydride or sodium borohydride.

The 17-hydroxy compounds obviously lend themselves to esterification so as to form esters which are commonly used in steroid synthesis and therapy such as acetates, propionates, cyclopentyl propionates, trimethyl acetates, t-butyl acetates and the like including phosphates, hemisuccinates, sulfobenzoates, and sodium salts thereof.

An alternate series of transformations leading to the novel compounds of this invention is shown in Scheme I. This method involves the introduction of the 9α-halogeno group via a Δ⁹⁽¹¹⁾-ene and 9β,11β-epoxy intermediate. Starting with a pregnane derivative, such as II, it is evident that a maximum of six-steps effect a transformation to 9α-fluoro- (or chloro)-16-methyl (α or β)-1,4-androstadiene-11β-ol-3,17-dione as represented by VIIIa. These steps are:

(a) Oxidative degradation of the pregnane side chain to 17-keto by sodium bismuthate in acetic acid.

(b) Introduction of the Δ¹-bond microbiologically or chemically.

(c) Dehydration of the hydroxyl group (α or β) so as to form a Δ⁹⁽¹¹⁾ unsaturation by known analogous reactions, such as reaction of the 11-alcohol with methylsulfonyl chloride or p-toluenesulfonyl chloride followed by in situ elimination of the elements of the particular sulfonic acid.

(d) Formation of a bromohydrin by reacting the Δ⁹⁽¹¹⁾-ene with hypobromous acid.

(e) Formation of a 9β,11β-epoxide from the bromohydrin by means of mild alkali.

(f) Reaction of the epoxide with hydrohalic acid.

It is evident from Scheme I, that many interconversions are possible. There is no particular order of carrying out the transformations except that steps c through f form a necessary sequence. At any stage, one can oxidize the side chain of the corresponding pregnane analog or dehydrogenate the A-ring.

Reaction Scheme II depicts transformations whereby a percursor having an 11-keto group is converted into products common with Scheme I and ultimately to VIIIa. The only additional step in this instance is that the 11-keto group must at some time be reduced to 11α-hydroxyl or 11β-hydroxyl. These reductions can be carried out according to techniques well known in the art and involve selective protection of other keto groups by ketal formation.

The reaction sequences shown are principally illustrative in nature. It should be apparent to one skilled in the art as to how to apply analogous known reactants to suit the present instance or what conditions are required. For example, in Scheme I, it is known that in the preparation of the 9(11)-dehydro-compound, the 21-hydroxyl group must first be esterified prior to mesylation or tosylation of the 11-hydroxyl group. It is also apparent that any hydroxyl group such as the 11-β-hydroxyl of VIII or VIIIa may be oxidized to ketone by conventional means such as by chromic acid. These conversions are not shown in the schematic diagrams but are illustrated in the following examples.

EXAMPLE 1

*9α-fluoro-16α-methyl-1,4-androstadiene-11β-ol-3,17-dione*

To a solution of 1.2 g. of 9α-fluoro-16α-methylprednisolone in 2 ml. of glacial acetic acid and 100 ml. of water is added 25 g. of sodium bismuthate and the mixture is stirred overnight at room temperature. After removing undissolved solids by filtration, the filtrate is diluted with water and extracted several times with methylene chloride. The methylene chloride extracts are combined and washed in turn with diluted sodium bicarbonate solution and then with water until neutral. The organic solution is then dried and evaporated to a residue consisting of the product of this example in crude form. Purification is effected by dissolving the crude residue from the methylene chloride extracts in acetone, heating the solution to boiling point and adding hexane until the acetone is gradually replaced and the boiling point of the resultant mixture is approximately that of hexane. Upon cooling and filtration, there is obtained 700 mg. of white crystals consisting of 9α-fluoro-16α-methyl-1,4-androstadiene-11β-ol-3,17-dione.

EXAMPLE 2

*9α-chloro-16α-methyl-1,4-androstadiene-11β-ol-3,17-dione*

The requisite intermediate, 9α-chloro-16α-methylprednisolone is obtained by subjecting 9α-chloro-16α-methylhydrocortisone to the dehydrogenating action of Corynebacterium simplex according to the procedure described in U.S. Patent No. 2,837,464.

Degradation of the side chain of 9α-chloro-16α-methylprednisolone is carried out in a manner identical to that described in Example 1 and there is obtained 9α-chloro-16α - methyl-1,4-androstadiene-11β-ol-3,17 - dione as a white crystalline substance.

EXAMPLE 3

*9α-bromo-16-methyl-1,4-androstadiene-11β-ol-3,17-dione*

The requisite intermediate, 9α-bromo-16α-methylprednisolone is obtained from the microbiological dehydrogenation of 9α-bromo-16α-methylhydrocortisone by means of Corynebacterium simplex according to the analogous procedure described in U.S. Patent No. 2,837,464.

Degradation of the side chain of this bromo intermediate is effected by sodium bismuthate in a manner analogous to that in Example 1 and there is obtained the compounds of this example as a white crystalline substance.

EXAMPLE 4

*16α-methyl-1,4-androstadiene-11β-ol-3,17-dione*

By subjecting 16α-methylprednisolone to oxidative degradation of sodium bismuthate according to the procedure described in Example 1, the compound of this example is obtained and is purified by crystallization from acetone-hexane.

The compound of this example, namely, 16α-methyl-1,4-androstadiene-11β-ol-3,17-dione is convertible into each of the products of Examples 1, 2 and 3 by conversions well-known in the art, for example, treating the substance with p-toluenesulfonyl chloride or methanesulfonyl chloride in a dimethyl formamide-pyridine solution yields the intermediary 16α-methyl-1,4,9(11)-androstatriene-3,17-dione which is formed by the in situ degradation of the 11β-tosylate. The triene is converted to the corresponding bromohydrin (9α-bromo-11β-hydroxy) by means of hypobromous acid. The bromohydrin formed thereby is identical with the compound of Example 3.

The bromohydrin may be converted to the chloro and fluoro analogs of Examples 1 and 2 by reacting same with potassium acetate in alcohol while refluxing, whereby the intermediate, namely, 9β,11β-oxido-16α-methyl-1,4-androstadiene-3,17-dione is formed. Opening the epoxide ring with hydrogen fluoride or hydrogen chloride (preferably in a solvent such as chloroform or tetrahydrofuran-chloroform) yields products which are identical respectively to those obtained in Examples 1 and 2.

EXAMPLE 5

*16α-methyl-1,4-androstadiene-3,11,17-trione*

The compound of this example is prepared by subjecting 16α-methylprednisone to the oxidative degradation of sodium bismuthate according to the analogous procedure of Example 1. A trione of this example is purified by crystallization from acetone-hexane and is obtained as a white crystalline substance.

Alternatively, the compound of this example is prepared by dissolving 300 mg. of 16α-methyl-1,4-androstadiene-11β-ol-3,17-dione in 10 ml. pyridine. To the solution is added 120 mg. of chromium trioxide and 1 ml. of water and the reaction mixture is allowed to stand at room temperature for 5 hours. The mixture is poured into water and extracted with methylene chloride then with organic extracts and washed in turn by sodium bicarbonate solution and then water until neutral and concentrated to dryness in vacuo to a residue. The residue is taken up in acetone and crystallized by the addition of hexane as described in Example 1 yielding the trione of this example.

EXAMPLE 6

*9α-fluoro-16α-methyl-1,4-androstadiene-3,11,17-trione*

The compound of this example is prepared according to the analogous procedure of Example 5 except that 9α-fluoro-16α-methylprednisone is oxidatively degraded with sodium bismuthate as described in Example 1. There is obtained 9α-fluoro-16α-methyl-1,4-androstadiene-3,11,17-trione.

The compound of this example may also be prepared by the alternate analogous procedure described in Example 5 wherein 9α-fluoro-16α-methyl-1,4-androstadiene-11β-ol-3,17-dione is oxidized with chromic acid to yield the trione.

In similar fashion, by beginning with the analogous 9α-chloro- or 9α-bromo- analogs and following the procedure described herein, there is obtained respectively 9α-chloro-16α-methyl-1,4-androstadiene-3,11,17-trione and 9α-bromo-16α-methyl-1,4-androstadiene-3,11,17-trione.

EXAMPLE 7

*9α-fluoro-16α-methyl-1,4-androstadiene-11β,17β-diol-3-one*

A culture of *Saccharomyces cerevisiae* (A.T.C.C. 4125) is grown for 48 hours on an agar medium of the following composition: yeast extract (Difco), 10 g.; cerelose, 60 g.; potassium dihydrogen phosphate, 4.49 g.; disodium hydrogen phosphate, 8.83 g.; agar, 20 g. and tap water to make one liter. The cell material from one agar slant is suspended in 5 ml. of saline and 1 ml. of this suspension was added to 100 ml. of the aforedescribed medium (without agar) in a 300 ml. Erlenmeyer flask. The resulting mixture is incubated at 30° C. on a shaker for 24 hours.

A fermenter containing 2 l. of the agar-free medium is inoculated with the 100 ml. of incubated mixture prepared previously and aerated at a rate of 1½ volumes of air per volume of medium per minute. After six hours of growth, 2 g. or 9α-fluoro-16α-methyl-1,4-androstadiene-11β-ol-3,17-dione in 50 ml. of ethanol is added to the fermenter and the reaction is allowed to proceed for 96 hours. The pH of the broth is adjusted to 3.5 with dilute hydrochloric acid and the reaction mixture is extracted with chloroform. The organic extracts are concentrated to an oily residue. The residue taken up in hexane and extracted three times with a 90% aqueous ethanol. The ethanol extracts are taken to dryness, and the residue is crystallized from acetone-hexane to give 9α-fluoro-16α-methyl-1,4-androstadiene - 11β,17β-diol-3-one.

Alternatively, 9α-fluoro-16α-methyl - 1,4 - androstadiene-11β,17β-diol-3-one is prepared by the following procedure:

The mixture of 1.95 g. of 9α-fluoro-16α-methyl-1,4-androstadiene-11β-ol-3,17-dione and 6.0 g. of lithium-aluminum tri-t-butoxy-hydride in 50 ml. of tetrahydrofuran is refluxed for 20 hours. The mixture is then poured into 250 ml. of water and the precipitated solids are extracted with chloroform. The chloroform extracts are dried and concentrated to a small volume. The concentrated solution is diluted with hexane and placed on a magnesium silicate adsorbing column. The column is eluted with ether and the ether eluates are evaporated to dryness. The residue so obtained is crystallized from methylene chloride hexane yielding the product of this example as a white crystalline substance.

By substituting a corresponding 9α-chloro- or 9α-bromo-analog for the starting 9α-fluoro substance in the above described procedures, there is obtained respectively 9α - chloro - 16α - methyl - 1,4 - androstadiene - 11β,17β-diol-3-one and 9α-bromo-16α-methyl-1,4-androstadiene-11β,17β-diol-3-one.

Similarly, 16α-methyl-1,4-androstadiene-11β,17β-diol-3-one is prepared by subjecting 16α-methyl-1,4-androstadiene-11β-ol-3,17-dione to either of the transformations described above.

EXAMPLE 8

*9α-fluoro-16α-methyl-1,4-androstadiene-17β-ol-3,11-dione*

By subjecting 9α-fluoro-16α-methyl-1,4-androstadiene-3,11,17-trione to the microbiological hydrogenation of *Saccharomyces cerevisiae* according to the analogous procedure of Example 7, the compound of this example is obtained. Similarly, 9α-H, 9α-chloro, and 9α-bromo analogs of the compound of this example are obtained by subjecting a corresponding 3,11,17-trione to the microbiological action of *Saccharomyces cerevisiae*. The products obtained thereby, namely, 16α-methyl-1,4-androstadiene-17β-ol-3,11-dione, 9α-chloro-16α-methyl-1,4-androstadiene-17β-ol-3,11-dione and 9α-bromo-16α-methyl-1,4-androstadiene-17β-ol-3,11-dione respectively are purified by recrystallization from acetone-hexane and are obtained as white crystalline substance.

EXAMPLE 9

*9α-fluoro-16β-methyl-1,4-androstadiene-11β-ol-3,17-dione*

By substituting the 16β-methyl epimer for the 16α-methyl starting material in Example 1 and following the procedure described in said Example 1, there is obtained 9α - fluoro - 16β - methyl - 1,4 - androstadiene - 11β - ol-3,17-dione.

The procedure for preparing the 16β-lower alkyl compounds of our invention are identical to those heretofore described for the 16α-methyl substances except in that the reaction is carried out on a 16β-methyl starting material. Thus, by substituting the analogous 16β-analog in each of the foregoing examples, there is obtained the following products: 9α-chloro-16β-methyl-1,4-androstadiene-11β-ol-3,17-dione from Example 2; 9α-bromo-16β-methyl-1,4-androstadiene-11β-ol-3,17-dione from Example 3; 16β-methyl - 1,4 - androstadiene - 11β-ol - 3,17 - dione from Example 4; 16β-methyl-1,4-androstadiene-3,11,17-trione and the corresponding 9α-fluoro-, 9α-chloro-, and 9α-bromo- from Examples 5 and 6; 16β-methyl-1,4-androstadiene-11β,17β-diol-3-one and the corresponding 9α-fluoro-, 9α-chloro- and 9α-bromo- from Example 7; 16β-methyl-1,4-androstadiene-17β-ol-3,11-dione and the corresponding 9α-fluoro-, 9α-chloro-, and 9α-bromo- from Example 8.

EXAMPLE 10

*Preparation of 17-esters: 9α-fluoro-16α-methyl-1,4-androstadiene-11β,17β-diol-3-one 17-acetate*

To a solution of 100 mg. of 9α-fluoro-16α-methyl-1,4-androstadiene-11β,17β-diol-3-one in 0.5 ml. of pyridine is added 0.5 ml. of acetic anhydride. The reaction is allowed to stand overnight at room temperature, water is then added and the resulting precipitate is removed by filtration. Purification is effected by recrystallization from acetone-hexane yielding the compound of this example as a white crystalline substance.

In similar fashion, the 17-acetates of all the previously described 17-ols are prepared. The procedure herein described is not limited to acetate but is applicable to general esterification at C-17 with other ester groups such as in the formation of propionates, butyrates, trimethylacetates, and the like.

EXAMPLE 11

*16α-methyl-1,4-androstadiene-11α-ol-3,17-dione*

The compound of this example is prepared by the action of sodium bismuthate on 16α-methyl-1,4-pregnadiene - 11α,17α,21 - triol - 3,20 -dione (prepared in co-pending application of Ilavsky and Herzog, Serial No. 762,926, filed September 24, 1958, according to the analogous procedure of Example 1.

In similar fashion the 16β-methyl analog is prepared from the corresponding 16β-methyl pregnadiene precursor.

Alternatively, the androstadiene of this example may be prepared as follows: Reaction of 16α-methyl-4-pregnene-11α,17α,21-triol-3,20-dione (co-pending application of Ilavsky et al., supra) with sodium bismuthate as in Example 1 yields the androstene intermediate, 16α-methyl-4 - androstene - 11α - ol - 3,17 - dione. Subjecting this substance to the microbiological dehydrogenating action of *Corynebacterium simplex* according to the method of U.S. Patent No. 2,837,464 yields the diene of this example.

EXAMPLE 12

*16α-methyl-1,4,9(11)-androstatriene-3,17-dione*

To a solution of 300 mg. of the compound of Example 4 in 5 ml. of pyridine is added 0.2 ml. of benzenesulfonyl chloride in 3 ml. of pyridine. The solution is allowed to stand for four hours and is then poured into a hydrochloric acid and ice mixture (1:1). The solids are filtered and crystallized from acetone-hexane to yield the triene of this example. Alternatively, the 11α-ol compound of Example 11 may be converted to the triene of this example as described above for the 11β-ol, except that the intermediary 11α-benzenesulfonate must be decomposed with base such as sodium acetate in acetic acid to yield the triene.

The 16α-methyl analog is prepared in a corresponding manner.

Alternatively, the compound of this example is prepared by first dehydrating 16α-methyl-4-pregnene-11 (α or β), 17α,21-triol-3,20-dione 21-acetate as described above to yield the corresponding 4,9(11)-pregnadiene. The Δ¹-bond and side chain cleavage is effected in any order as described heretofore.

According to the procedure described above, but selecting the appropriately substituted 16-alkyl starting material, the corresponding androstatriene is prepared such as 16β-methyl-1,4,9(11)-androstatriene-3,17-dione, the 16α-ethyl, 16β-ethyl, 16α-butyl, and 16β-butyl analogs thereof.

The compound of this example, 16α-methyl-1,4,9(11)-androstatriene-3,17-dione, is converted to 9α-bromo-16α-methyl-1,4-androstadiene-11β-ol-3,17-dione of Example 3 by the following procedure. A suspension of 200 mg. of the triene in 20 ml. of purified dioxane, 2 ml. of water, and containing 100 mg. of N-bromoacetamide and 1 ml. of 1.5 N-perchloric acid is stirred for 2 hours. During this stirring period, the mixture becomes homogenous and there is added a solution of 200 mg. of sodium sulfite in 2 ml. of water. The mixture is extracted with methylene chloride and the organic extracts are washed with water, dried, and evaporated to a solid residue which is crystallizable from acetone yielding the bromohydrin which is identical with Example 3.

EXAMPLE 13

*16α-methyl-9β,11β-oxido-1,4-androstadiene-3,17-dione*

To a solution of 300 mg. of the bromohydrin of Example 3 in 20 ml. of acetic acid is added 300 mg. of potassium acetate. The mixture is refluxed for two hours and then concentrated to a residue in vacuo. The residue is triturated with water whereupon the insoluble product is removed by filtration and crystallized from aqueous methanol yielding the oxido compound of this example.

The oxido diene of this example may also be prepared by a series of transformations identical with those described above except that the original starting material contains only a single double bond at the 4,5-position. By following the procedure, there is thus obtained 16α-methyl-9β,11β-oxido-4-androstene-3,17-dione. This monoene is now subjected to microbiological dehydrogenation according to the analogous procedure described in U.S. Patent No. 2,837,464 whereupon the desired diene is produced.

Similarly, by proper choice of starting material, other 16-lower alkyl analogs of the compounds of this example are obtainable by procedures described above.

The compound of this example is convertible into the fluorohydrin of Example 1 by means of the following procedure. A solution of 200 mg. of the oxido diene in 10 ml. of alcohol-free chloroform is saturated with anhydrous hydrogen fluoride while maintaining the reaction temperature of 0° C. After standing for four hours at 0° C., the mixture is concentrated to a residue in vacuo and the residue is crystallized from acetone-hexane to yield the compound of Example 1.

By substituting anhydrous hydrogen chloride, there is obtained the chlorohydrin of Example 2.

EXAMPLE 14

*16β-methyl-1,4-androstadiene-3,11,17-trione*

By subjecting 16β-methylprednisone to the oxidative degradation effected by sodium bismuthate according to the analogous procedure of Example 1, there is obtained the trione of this example.

Alternatively, 16β-methylcortisone upon reaction with sodium bismuthate gives rise to 16β-methyl-4-androstene-3,11,17-trione. This compound upon microbiological dehydrogenation with *Corynebacterium simplex*, according to the analogous procedures of U.S. Patent No. 2,837,464, yields the diene of this example.

In order to serve as a useful intermediate, it is necessary for the 11-keto to be reduced to a hydroxy group so that there may be introduced a 9α-halogeno-11β-hydroxyl grouping via a Δ9(11)-ene and 9β,11β-oxido compound as analogously described heretofore. The reduction of the 11-keto in the presence of the 3- and 11-keto can be carried out by any of the methods well-known in the art relating to selective hydrogenation. For example, ketalization of the 3- and 17-ketone groups with ethylene glycol followed by reduction of the 11-ketone with a lithium aluminum hydride according to the standard known methods ultimately yields, after regeneration of the 3,17-keto groups, the 11β-hydroxy analog of the trione mentioned above. The ketalization is preferably effected on a 3,17-diketo-Δ4-monoene, with the Δ1-bond being introduced subsequently by microbiological techniques. If a reagent such as sodium and alcohol is used, then the 11α-hydroxy epimer is obtained. These 11-hydroxy compounds are now convertible as described in previous examples to the 9α-halogeno-11β-hydroxy analogs.

Instead of ketalizing both the 3- and the 17-ketal groups of the Δ4-monoene, it is possible by known analogous techniques to selectively protect only the ketone by C-3. Under these circumstances, the 17-keto group will be reduced to hydroxyl and said 17-hydroxyl group will be carried through in the ensuing transformations ultimately yielding, for example, 16β-methyl-9α-fluoro-1,4-androstadiene-11β,17β-diol-3-one.

The foregoing examples are merely illustrative in nature. It is apparent from the foregoing descriptions that the many interconversions and transformations are equally applicable to the preparation of other compounds embraced by our invention. Although, for the most part, the examples specifically show the preparation of 16α-methyl and 16β-methyl compounds, the identical series of transformations described may be applied to the preparation of other lower alkyl substituents at C-16, such as propyl and butyl. Similarly, each and every possible 17-hydroxylated compound or 17-esterified compound of the invention is not shown but is illustrated by the examples. Our invention therefore is limited only as defined in the following claims.

We claim:
1. Androstadienes having the formula:

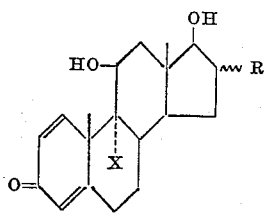

wherein X is a halogen having an atomic weight less than 100 and R is a lower alkyl group.

2. 17-lower alkanoyl esters of the compounds of claim 1.

3. Androstadienes having the formula:

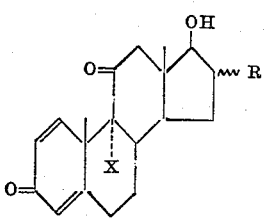

wherein X is a halogen having an atomic weight less than 100 and R is a lower alkyl group.

4. 17-lower alkanoyl esters of the compounds of claim 3.

5. A 16-lower alkyl-1,4-androstadiene-11α-ol-3,17-dione.

6. A 16-lower alkyl-1,4-androstadiene-11β,17-β-diol-3-one.

7. A 16-lower alkyl-1,4-androstadiene-11α,17β-diol-3-one.

8. A 16-lower alkyl-1,4-androstadiene-17β-ol-3,11-dione.

9. 9α-fluoro-16-methyl-1,4-androstadiene-11β,17β-diol-3-one.

10. 9α-fluoro-16-methyl-1,4-androstadiene-17β-ol-3,11-dione.

11. A compound of the group consisting of 9β,11β-epoxy-androstanes having the following formulae:

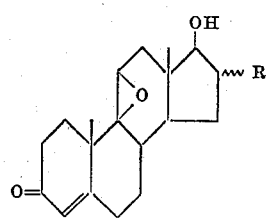

and

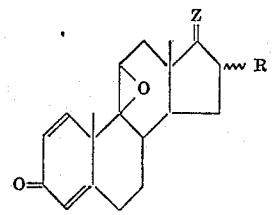

wherein R is a lower alkyl group; and Z is a member of the group consisting of O and (H, βOH).

12. A compound of the group consisting of 9(11)-dehydro-androstanes having the following formulae:

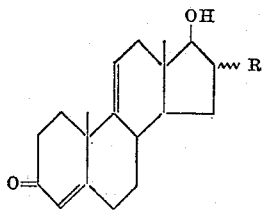

and

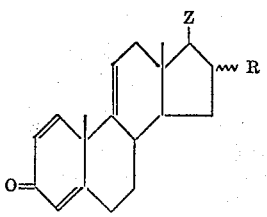

wherein R is a lower alkyl group, and Z is a member of the group consisting of O and (H, βOH).

13. A compound of the group consisting of androstadienes of the following formula:

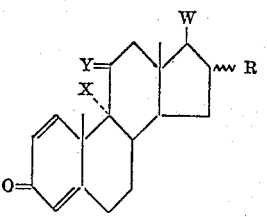

wherein R is a lower alkyl group; X is a member of the group consisting of hydrogen and a halogen having an atomic weight less than 100; Y is a member of the group consisting of O and (H, βOH) and W is a member of the group consisting of hydroxy and lower alkanoyloxy.

(References on following page)

References Cited in the file of this patent

UNITED STATES PATENTS

| | | |
|---|---|---|
| 2,588,391 | Julian et al. | Mar. 11, 1952 |
| 2,769,019 | Herr et al. | Oct. 30, 1956 |
| 2,772,298 | Chinn | Nov. 27, 1956 |
| 2,781,368 | Heyl et al. | Feb. 12, 1957 |
| 2,836,607 | Agnello et al. | May 27, 1958 |
| 2,837,464 | Nobile | June 3, 1958 |
| 2,864,833 | Agnello | Dec. 16, 1958 |
| 2,955,118 | Nobile | Oct. 4, 1960 |

OTHER REFERENCES

Herzog et al.: Chem. Abst., vol. 50, 6487–88 (1956).